(12) United States Patent
Vandanapu

(10) Patent No.: US 11,568,078 B2
(45) Date of Patent: Jan. 31, 2023

(54) OBFUSCATION OF QUERIES AND RESPONSES IN A SECURITY DATA SEARCH SYSTEM

(71) Applicant: Constella Intelligence, Inc., Los Altos, CA (US)

(72) Inventor: Pulleswararao Naga Vandanapu, Redwood City, CA (US)

(73) Assignee: Constella Intelligence, Inc., Los Altos, CA (US)

( * ) Notice: Subject to any disclaimer, the term of this patent is extended or adjusted under 35 U.S.C. 154(b) by 370 days.

(21) Appl. No.: 16/934,415

(22) Filed: Jul. 21, 2020

(65) Prior Publication Data

US 2022/0027497 A1    Jan. 27, 2022

(51) Int. Cl.
*G06F 21/62* (2013.01)
*G06F 21/31* (2013.01)
*G06F 21/60* (2013.01)

(52) U.S. Cl.
CPC .......... *G06F 21/6227* (2013.01); *G06F 21/31* (2013.01); *G06F 21/602* (2013.01); *G06F 21/6254* (2013.01)

(58) Field of Classification Search
CPC .... G06F 21/6227; G06F 21/31; G06F 21/602; G06F 21/6254
See application file for complete search history.

(56) References Cited

U.S. PATENT DOCUMENTS

| | | | | |
|---|---|---|---|---|
| 11,381,859 B1 * | 7/2022 | Dailey | | G06F 16/137 |
| 11,444,968 B1 * | 9/2022 | Wolpoff | | H04L 63/1433 |
| 2022/0197910 A1 * | 6/2022 | Gladwin | | G06F 16/2428 |
| 2022/0207180 A1 * | 6/2022 | Torbey | | G06F 21/6254 |
| 2022/0215101 A1 * | 7/2022 | Rioux | | G06F 21/55 |
| 2022/0224707 A1 * | 7/2022 | Kapoor | | H04L 67/535 |
| 2022/0232024 A1 * | 7/2022 | Kapoor | | H04L 67/306 |
| 2022/0232025 A1 * | 7/2022 | Kapoor | | G06F 16/9024 |

(Continued)

OTHER PUBLICATIONS

The International Searching Authority, "Search Report" in Application No. PCT/US2021/041876, dated Nov. 12, 2021, 14 pages.

(Continued)

*Primary Examiner* — Joseph P Hirl
*Assistant Examiner* — Stephen T Gundry
(74) *Attorney, Agent, or Firm* — Hickman Becker Bingham Ledesma LLP

(57) ABSTRACT

A method comprises: generating a first partial hash of the user identity information, transmitting a first query to a server computer, in response to transmitting the first query, receiving query metrics that indicate a set of counts of expected results, determining whether a count of expected results of the first partial hash satisfies a threshold count of expected results, in response to determining that the count of expected results of the first partial hash satisfies the threshold: generating and transmitting a second query, and in response, receiving and storing a set of user identity records that match at least the first partial hash, querying the set of user identity records using the user identity information and in response, receiving a result set of user identity records, the result set of user identity records comprising one or more user identity records that match the user identity information.

20 Claims, 5 Drawing Sheets

(56) References Cited

U.S. PATENT DOCUMENTS

2022/0247769 A1* 8/2022 Erlingsson .............. H04L 63/10
2022/0255753 A1* 8/2022 Struttmann ........... H04L 9/0637
2022/0279004 A1* 9/2022 Erlingsson .......... G06F 16/9038

OTHER PUBLICATIONS

Li et al., "Protocols for Checking Compromised Credentials", CCS 2019, Session 6E: Passwords and Accounts, https://doi.org/10.1145/3319535.3354229, dated Nov. 2019, 18 pages.

Ali, Junade "Validating Leaked Passwords with k-Anonymity", https://blog.cloudflare.com/validating-leaked-passwords-with-k-anonymity, dated Feb. 2018, 10 pages.

* cited by examiner

OBFUSCATION OF QUERIES AND RESPONSES IN A SECURITY DATA SEARCH SYSTEM

FIELD OF THE DISCLOSURE

One technical field of the present disclosure is computer-implemented secure data retrieval and transmission. Yet another technical field is computer-implemented querying techniques.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As a result of cyber-attacks and data breaches, hacked, dumped, lost, leaked and otherwise compromised identity information is proliferated throughout the world wide web. "Dark web" sites host files that contain thousands to millions of usernames, passwords, and identifying information associated with user accounts. To keep track of compromised identity information, various techniques such as auto-crawling, scraping, and manual monitoring can be used to retrieve and store an amalgamation of compromised data from a variety of sources. For example, hackers often publish data to various sources that contains thousands of compromised usernames, passwords and associated identifying information. Such data can be retrieved, normalized, and stored in a searchable database along with other user identity information that may or may not be compromised.

Keeping an updated database of compromised and uncompromised identity information can be useful to entities or individuals for a variety of applications. For example, an entity may identify that their servers are being attacked from a specific geolocation in Europe. By querying the specific geolocation against the database of identity information, any identity information that is associated with the geolocation is returned, such as any usernames, email addresses, or other data that is associated with the geolocation. Such information can be used to further investigate the attacks and bring malicious actors to justice.

However, given that such a database is of large scale and is typically managed by one or more controlling entities, a query issued by a third party to the database for identity information may reveal information about who or what the third party is searching for and may require the third party to comply with various data privacy regulations. Additionally, from the perspective of the database, any sharing of such identity information, such as in response to a query, may further expose identity information to malicious actors and also require a party that manages the database to comply with various data privacy regulations.

Thus, computer-implemented techniques are desired to facilitate the obfuscation of queries and responses to queries.

SUMMARY

The appended claims may serve as a summary of the invention.

DESCRIPTION OF EXAMPLE EMBODIMENTS

Figure 1:
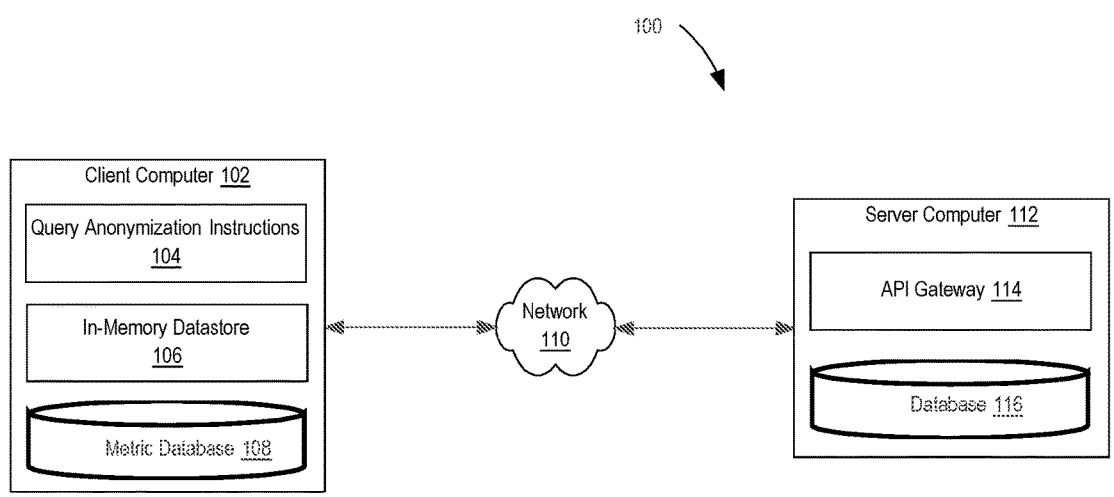
FIG. 1 illustrates an example computer system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention. Embodiments are described in sections according to the following outline:

1. OVERVIEW
2. EXAMPLE SYSTEM IMPLEMENTATION
3. EXAMPLE FUNCTIONAL IMPLEMENTATION WITH SERVER-SIDE QUERY METRICS
4. EXAMPLE FUNCTIONAL IMPLEMENTATION WITH CLIENT-SIDE QUERY METRICS
5. EXAMPLE IMPLEMENTATION
6. IMPLEMENTATION EXAMPLE—HARDWARE OVERVIEW
7. OTHER ASPECTS OF DISCLOSURE

1. OVERVIEW

Systems and methods are provided for obfuscation of queries and responses in a security data search system. User identity information and associated information is collected from a plurality of sources and stored in a searchable database as user identity records. Each user identity record is stored as a hashed user identity record and a corresponding unhashed user identity record.

A client computer targets a search for information stored in the searchable database that relates to a particular piece of user identity information. The client computer generates a first partial hash of the user identity information that comprises a plurality of characters. For example, a client computing device may first generate a full hash of the username: "User1234" represented by the character string: "180906e54fa0115f6aea04fdc51f3287da". A subset of characters from the full hash may be selected to form the first partial hash, such as the first eight characters of the full hash: "180906e5".

A first query is generated based on a subset of characters the first partial hash and transmitted to a server computer device for further processing. For example, the first seven characters of the partial hash may be selected to generate a query for the value: "180906e".

The server computing device receives the first query and executes the first query against the searchable database. The first query is programmed to retrieve query metrics that indicate a set of counts of expected results associated with the subset of characters of the first partial hash. For example, the query may return the set of counts: "180906e5":30, "180906ea":5 "180906ec":10 which includes multiple partial hash values, including the first partial hash, and corresponding counts of expected results.

Based on the query metrics, the client computer determines whether a count of expected results of the first partial hash satisfies a threshold count of expected results. For example, the client computer compares the '30' expected results of the first partial hash to a threshold value. If the count of expected results for the first partial hash satisfies the threshold value, the client computer generates and transmits a second query that comprises the first partial hash to the server computer.

If the count of expected results for the first partial hash does not satisfy the threshold value, the client computer randomly selects an additional partial hash from the set of counts and combines the count of expected results of the first partial hash and expected results of the additional partial hash into a total count of expected results. The total count of expected results is then compared to the threshold value. If the total count of expected results for the first partial hash and additional partial hash satisfies the threshold value, the client computer generates and transmits a second query that comprises the first partial hash and additional partial hash to the server computer. If the total count of expected results for the first partial hash and additional partial hash does not satisfy the threshold value, the process of randomly selecting a further partial hash from the set of counts is repeated until enough partial hashes and corresponding counts of expected results satisfy the threshold value.

Upon receiving the second query, the server computer executes the second query against the searchable database to retrieve unhashed user identity records that match the one or more partial hashes specified in the second query. The matching user identity records are transmitted to the client computer and stored in memory at the client computer. The client computer then queries the matching user identity records that are stored in memory using the original piece of user identity information to filter out any unmatching records.

Techniques discussed herein provide enhanced obfuscation of queries and responses in a security data search system. For example, by generating the first query that comprises the first partial hash of user identity information that is to be searched against the database, any malicious actor that intercepts the request will be unaware of the core data that the partial hash represents. To further enhance security and obfuscation, only a subset of characters of the first partial hash are used in the first query.

Additionally, the first query is used to obtain query metrics that indicates sets of counts of expected results for partial hashes that include the subset of characters of the first partial hash. By analyzing the set of counts of expected results for different partial hashes, a second query is generated that further obfuscates the target of the database search. For example, by ensuring that the first partial hash returns a threshold count of results, or by combining the first partial hash "abcdefgh" with additional partial hashes to retrieve a threshold count of results, the actual target of the database search that is represented by the first partial hash is obfuscated in the set of retrieved results. Once the set of user identity records that match the partial hash are retrieved and stored in memory at the client computer, false positive records are filtered out from the set of results by executing a second query that includes the target user identity information. The resulting set of user identity records includes any data records that match the original target of the database search. The end result provides a client with a targeted database search that includes a combination of multiple layers of obfuscation and security that effectively reduce sensitive data exposure and attack surface area to malicious actors.

2. EXAMPLE COMPUTER SYSTEM IMPLEMENTATION

FIG. 1 illustrates an example networked computer system with which various implementations may be practiced. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of how to obfuscate queries and responses to queries. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1 is shown in simplified, schematic format for purposes of illustrating a clear example and other implementations may include more, fewer, or different elements. System 100 comprises various entities and devices which may be used to practice an implementation. Network 110 is a network entity which facilitates communication between entities depicted in FIG. 1. Connection to network 110 is show by double-sided arrows between a connecting entity and network 110. Network 110 may be any electronic communication medium or hub which facilitates communications between two or more entities, including but not limited to an internet, an intranet, a local area connection, a cloud-based connection, a wireless connection, a radio connection, a physical electronic bus, or any other medium over which digital and electronic information may be sent and received.

Server computer 112 is connected to network 110 and is an entity which facilitates a partial obfuscation of data records in result sets resulting from search queries. Server computer 112 may be any hardware, software, virtual machine, or general-purpose entity capable of performing the processes discussed herein. In various implementations, server computer 112 implements and executes API gateway 114, the functions of which are described in other sections herein. The server computer 112 may also execute additional code, such as code for receiving requests from client computer 102 and code for querying data from database 116.

API gateway 112 comprises computer executable instructions programmed or configured to receive requests, calls or queries from client computer 102. API gateway 112 may be programmed or configured to interface and communicate with database 116 in response to received requests, calls or queries from client computer 102. In some embodiments, API gateway 112 handles such requests by invoking available microservices or management systems to execute queries and aggregate the results of such queries. API gateway 112 may be programmed or configured to transmit result data to client computer 102.

Database 116 may be any number of individual or linked storage devices or mediums which allow the storage of digital data, as discussed herein. Database 116 may further include one or more database management systems (DBMS) for accessing, retrieving, storing, and/or manipulating data stored in database 116. The DBMS may use any of a variety of database models (e.g., relational model, object model, etc.) and may support any of a variety of query languages. In one embodiment, database 116 stores user identity records. Each user identity record includes user identity information and user credentials that are collected from a plurality of sources. Each user identity record stored in database 116 comprises an unhashed user identity record and a corresponding hashed user identity record. For example, for each user identity record, a hashed user identity record and an unhashed user identity record is stored in database 161. An unhashed user identity record may comprise a plain-text representation of the respective user identity record. A hashed user identity record may comprise a hashed representation of the respective user identity record. Any applicable hash function may be used to generate a hashed user identity record. An example hash algorithm that may be used in SHA-256. In one embodiment, database 116 stores query metrics that indicate counts of expected results associated with different queries.

Client computer 102 is a device/entity which allows a client to generate requests and queries, transmit requests and queries to server computer 112, and receive responses to requests and queries from server computer 112. Client computer 102 may be any device, such as a mobile computing device, capable of connection to network 110 through any method described herein. Client computer 102 may comprise various programs, modules, or software applications that may be used to generate requests, receive responses to requests, and execute programmatic functions in response to requests. In various implementations, client computer 102 implements and executes query anonymization instructions 104, the functions of which are described in other sections herein. Client computer 102 may receive actions comprising instructions, requests, notifications, and/or recommendations to execute or display from server computer 112. Client computer 102 may also execute additional code, such as code for transmitting and receiving requests and/or data from client computer 102 and code for querying data from in-memory datastore 106 and metric database 108.

The query anonymization instructions 104 may be programmed or configured to generate hashes of digital data such as user identity information. For example, query anonymization instructions 104 may be programmed or configured to generate a full hash of user identity information. User identity information may comprise a username, email address, geolocation or any identification value that may be used to identify a user. Any applicable hash function may be used to generate a full hash of the particular user identity information. An example hash algorithm that may be used in SHA-256.

Query anonymization instructions 104 may be further programmed or configured to generate a partial hash of user identity information based on a full hash of user identity information. For example, query anonymization instructions 104 may generate a partial hash of user identity information by selecting a subset of characters of a full hash of user identity information. In one embodiment, a partial hash of user identity information may comprise the first eight characters of the full SHA-256 hash of the user identity information.

Query anonymization instructions 104 may be programmed or configured to generate and transmit queries to metric database 108 or database 116 for query metrics relating to generated hashes. Query anonymization instructions 104 may be programmed or configured to generate and transmit queries to determine whether a count of expected results from received query metrics satisfies a threshold count of expected results.

Query anonymization instructions 104 may be programmed or configured to generate and transmit queries to database 116 for user identity records relating to generated hashes. Query anonymization instructions 104 may be programmed or configured to store received user identity records in in-memory datastore 106. Query anonymization instructions 104 may be programmed or configured to generate and transmit queries to in-memory datastore 106 for user identity records. Query anonymization instructions 104 may also be used for implementing aspects of the flow diagrams that are further described herein.

Metric database 108 may be any number of individual or linked storage devices or mediums which allow the storage of digital data, as discussed herein. Metric database 108 may further include one or more database management systems (DBMS) for accessing, retrieving, storing, and/or manipulating data stored in metric database 108. The DBMS may use any of a variety of database models (e.g., relational model, object model, etc.) and may support any of a variety of query languages.

In one embodiment, metric database 108 stores query metrics that indicate counts of expected results associated with different queries. In one embodiment, metric database 108 is managed by client computer 102. Metric database 108 may comprise a privileged database that only client computer 102 or another client device with the requisite privileges can access.

In-memory datastore 106 comprises non-transitory storage media that stores data for quick access. For example, in-memory datastore 106 stores digital data such as user identity records in memory instead of a disk drive to produce quicker response times. Accessing data stored in memory eliminates the overhead needed to query data from a disk. In one embodiment, in-memory datastore 106 stores digital data such as data records received from server computer 112 as a result of a query.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer system 112.

Any of the components of the system 100 and associated architecture may include alternate and/or additional hardware, software, or firmware components beyond those described or depicted without departing from the scope of the disclosure. For example, hardware, software, or firmware components depicted or described as forming part of any of the illustrative components of the system 100, and the associated functionality that such components support, are merely illustrative and that some components may not be present or additional components may be provided in various embodiments. While various program modules have been depicted and described with respect to various illustrative components of the system 100, the functionality described as being supported by the program modules may be enabled by any combination of hardware, software, and/or firmware. Each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. The functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

The system 100 is one example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system 100, or additional functionality.

3. EXAMPLE FUNCTIONAL IMPLEMENTATION WITH SERVER-SIDE QUERY METRICS

Figure 2:
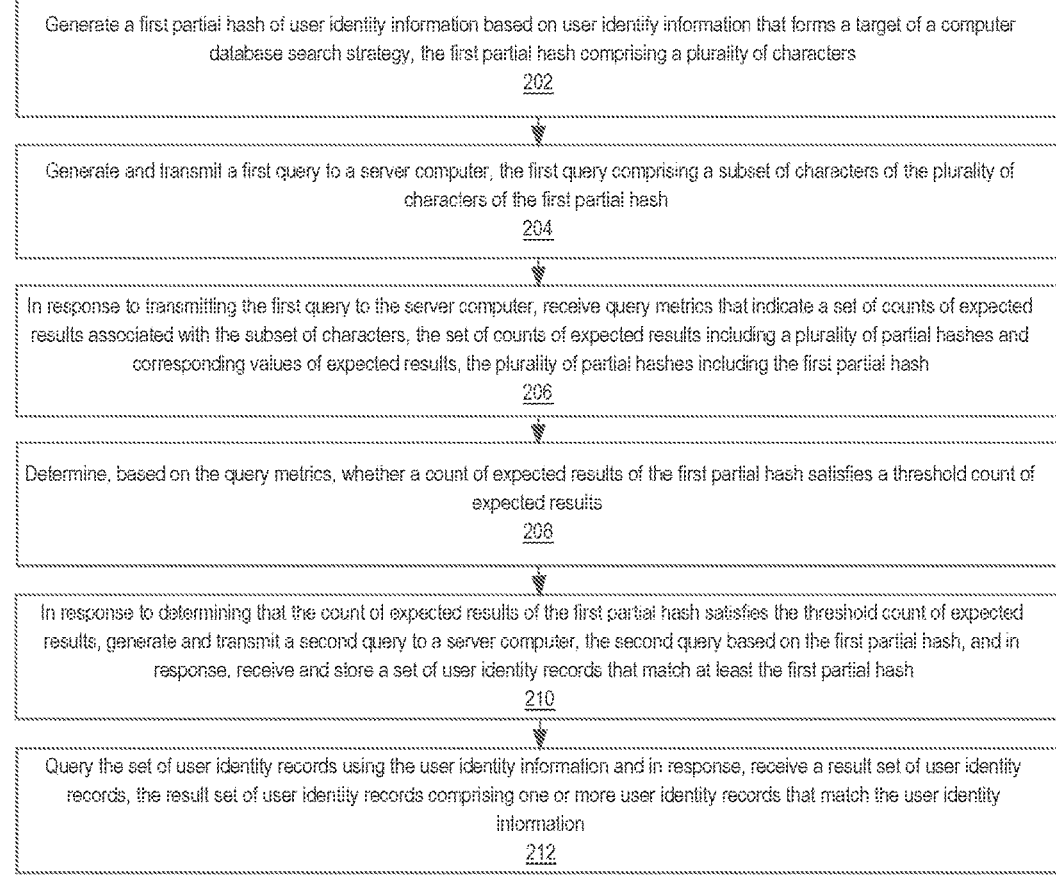
FIG. 2 illustrates an example flowchart of a method for partial obfuscation of data records in result sets resulting from search queries with server side query metrics, according to an embodiment.

FIG. 2 shows an example flowchart of a method for partial obfuscation of data records in result sets resulting from search queries with server side query metrics, according to an embodiment.

Although the steps in FIG. 2 are shown in one example order, the steps of FIG. 2 may be performed in any order and are not limited to the order shown in FIG. 2. Additionally, some steps may be optional, may be performed multiple times, or may be performed by different components. All steps, operations, and functions of a flow diagram that are described herein are intended to indicate operations that are performed using programming in a special-purpose computer or general-purpose computer, in various embodiments. Each flow diagram and block diagram is presented at the same level of detail that persons skilled in the applicable technical fields use to communicate with one another about plans, specifications, algorithms, and data structures as a basis for programming implementations to solve the applicable technical problems, while also applying their accumulated knowledge and skill of computer architecture, programming, and engineering techniques. Each flow diagram in this disclosure provides a guide, plan, or specification of an algorithm for programming a computer to execute the functions that are described.

In step 202, a first partial hash of user identity information is generated based on the user identify information that forms a target of a computer database search strategy. The first partial hash comprises a plurality of characters. For example, client computer 102 first generates a full hash of user identity information. User identity information may comprise a username, email address, credit card number, geolocation, financial account number or any identification value that is associated with or identifies a user account. Any applicable hash function may be used to generate a full hash of the particular user identity information. An example hash algorithm that may be used in SHA-256. Based on the full hash of the particular user identity information, client computer 102 generates a partial hash of the particular user identity information, the partial hash comprising a plurality of characters.

In one embodiment, the partial hash of the particular user identity information comprises a subset of characters of a full hash of the user identity information. For example, the partial hash of the particular user identity information may comprise the first eight characters of the full SHA-256 hash of the user identity information.

In step 204, a first query is generated and transmitted to a server computer. The first query comprises a subset of characters of the plurality of characters of the first partial hash. For example, client computer 102 first generates a first query by selecting a subset of characters of the plurality characters of the first partial hash generated in step 202. As an example, if the first partial hash comprises eight characters, seven of the eight characters are selected as the subset of characters of the first partial hash. Once the first query is generated, client computer 102 transmits the query to server computer 112.

In step 206, query metrics are received in response to transmitting the first query to the server computer. The query metrics indicate a set of counts of expected results associated with the subset of characters of the first partial hash. The set of counts of expected results associated with the subset of characters of the first partial hash includes a plurality of partial hashes and corresponding values of expected results. Each of the plurality of partial hashes includes the subset of characters of the first partial hash. The plurality of partial hashes includes the first partial hash. For example, in response to receiving the first query, server computer 112 executes the first query against database 116 to retrieve query metrics that specify a set of counts of expected results associated with the subset of characters included in the first query. Server computer 112 transmit the query metrics to client computer 102.

As an example, the query metrics for the subset of characters of the first partial hash may comprise a JSON or XML file that includes a set of counts of expected results associated with the subset of characters of the first partial hash. If the first partial hash is 'abcdefgh' and the subset of characters of the first partial hash is 'abcdefg', the set of counts of expected results will include multiple counts of expected results for queries that include the subset of characters of the first partial hash 'abcdefg'. The set of counts may include key values that include at least the subset of characters of the first partial hash and corresponding counts of expected results. For example, the set may include key values that comprise: the subset of characters of the first partial hash appended to an additional character and corresponding counts of expected results such as: {abcdefga: 10 values; abcdefgb: 22 values; abcdefgc: 31 values; abcdefgd; 40 values}. As shown, the set of counts of expected results includes a count of expected results for a plurality of partial hashes that includes the first partial hash.

In step 208, it is determined, based on the query metrics, whether a count of expected results of the first partial hash satisfies a threshold count of expected results. For example, client computer 102 compares a count of expected results of the first partial hash from the query metrics obtained in step 206 to a threshold count of expected results to determine whether the threshold is satisfied. The threshold count of expected results may be specified by an administrator of client computer 102 or automatically set to a default value.

In step 210, in response to determining that the count of expected results of the first partial hash satisfies the threshold count of expected results, a second query is generated and transmitted to a server computer. The second query is based on the first partial hash. In response to transmitting the second query, a set of user identity records that match at least the first partial hash is received and stored. The set of user identity records includes one or more user identity records that match the user identity information that forms the target of the computer database search strategy includes and one or more user identity records that do not match the user identity information that forms the target of the computer database search strategy.

For example, client computer 102 determines that the count of expected results of the first partial hash from the query metrics satisfies the threshold count of expected results. In response to the determination, a second query is generated based on the partial hash. In some embodiments, the second query comprises the first partial hash. Client computer 102 transmits the second query to server computer 112. Server computer 112 executes the second query against database 116 to retrieve a set of user identity records that match the first partial hash. Identifying the set of user identity records that match at least the first partial hash may comprise first identifying a set of hashed user identity records that match the partial hash. Based on the set of hashed user identity records, a corresponding set of unhashed user identity records is identified in database 116.

As an example, assume the first partial hash is 'abcdefgh'. Assume the subset of characters of the first partial hash is 'abcdefg'. Assume the set of counts of expected results associated with the subset of characters of the first partial hash comprises the set: {'abcdefgh': 25 values; 'abcdefga': 2 values; 'abcdefgb' 10 values;}. As shown in the set, each different partial hash includes the subset of characters of the first partial hash 'abcdefg'. Now assume the threshold count of expected results is defined as '20 values'. By analyzing the set of counts of expected results associated with the subset of characters of the first partial hash, it can be determined that the first partial hash: 'abcdefgh' is associated with a count of 25 values and thus satisfies the threshold count of expected results of '20 values'.

In one embodiment, in response to determining that the count of expected results of the first partial hash does not satisfy the threshold count of expected results, a second partial hash is selected from the set of counts of expected results associated with the subset of characters. For example, if the count of expected results of the first partial hash does not satisfy the threshold count of expected results, a second partial hash is randomly selected from the plurality of partial hashes included in the set of counts of expected results.

As an example, assume the first partial hash is 'abcdefgh'. Assume the subset of characters of the first partial hash is 'abcdefg'. Assume the set of counts of expected results associated with the subset of characters of the first partial hash comprises the set: {'abcdefgh': 25 values; 'abcdefga': 2 values; 'abcdefgb' 10 values;}. As shown in the set, each different partial hash includes the subset of characters of the first partial hash 'abcdefg'. Now assume the threshold count of expected results is defined as '30 values'. Because the set of counts of first partial hash 'abcdefgh' does not satisfy the threshold count of '30 values', a second partial hash is randomly selected from the plurality of partial hashes included in the set of counts of expected results. Now assume that the second partial hash that is selected is 'abcdefgb', which corresponds to '10 values'. By combining the '25 values' of the first partial hash with the '10 values' of the second partial hash, the threshold count of expected results of '30 values' is satisfied. The first partial hash and the second partial hash can be combined into a single query and transmitted to server computer 112 to obtain a threshold amount of results.

In some embodiments, if the first partial hash and second partial hash do not satisfy the threshold count of expected results, a third partial hash is randomly selected from the plurality of partial hashes included in the set of counts of expected results. The count of expected results of the third partial hash is combined with the counts of expected results of the first and second partial hashes to determine if the total count of the first, second and third partial hashes satisfy the threshold count of expected results. If the threshold count of expected results is satisfied, the first partial hash, the second partial hash, and third partial hash can be combined into a single query and transmitted to server computer 112 to obtain a threshold amount of expected results. In some embodiments, the procedure of randomly selecting partial hashes from the plurality of partial hashes and combining the partial hashes into a single query is repeated until the threshold amount of expected results is satisfied.

The procedure of randomly selecting partial hashes from the set when the threshold count is not satisfied provides a further layer of obfuscation. Due to the random nature of selecting additional partial hashes to include with a query, any malicious actor is unable to identify which partial hash included in the second query is the actual target of the database search.

In some embodiments, the order of partial hashes included in the second query is randomized. For example, if the query is for three partial hashes, the order of the three partial hashes as specified in the query is randomized to further obfuscate the query.

In some embodiments, the set of user identity records returned from server computer 112 is stored in memory at client computer 102. For example, the received set of user identity records is stored in in-memory datastore 106 for quick access by client computer 102.

In step 212, the set of user identity records is queried using the user identity information and in response, a result set of user identity records is received. The result set of user identity records comprises one or more user identity records that match the user identity information. In some embodiments, the result set of user identity records is unhashed. For example, client computer 102 queries in-memory datastore 106 using the user identity information. The query returns a result set of user identity records that match the user identity information.

4. EXAMPLE FUNCTIONAL IMPLEMENTATION WITH CLIENT-SIDE QUERY METRICS

Figure 3:
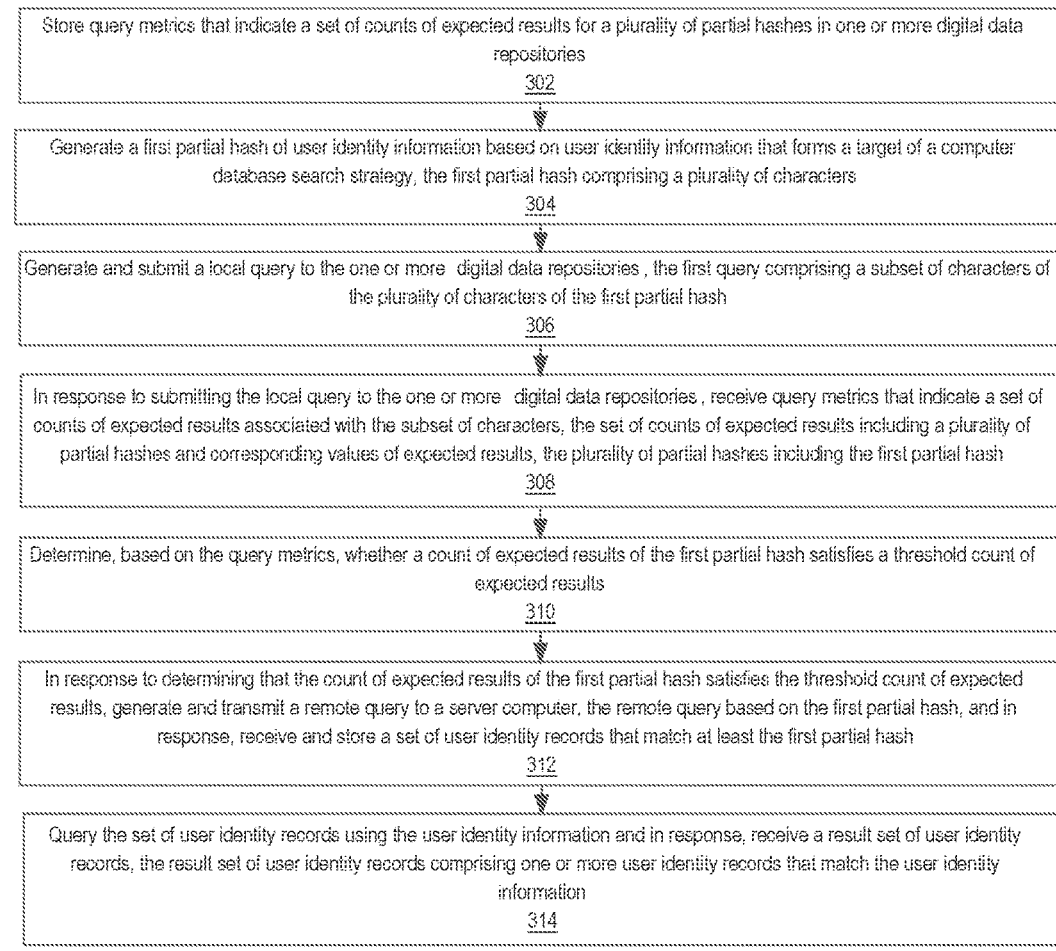
FIG. 3 illustrates an example flowchart of a method for partial obfuscation of data records in result sets resulting from search queries with client side query metrics, according to an embodiment.

FIG. 3 shows an example flowchart of a method for partial obfuscation of data records in result sets resulting from search queries with client side query metrics, according to an embodiment.

Although the steps in FIG. 3 are shown in one example order, the steps of FIG. 3 may be performed in any order and are not limited to the order shown in FIG. 3. Additionally, some steps may be optional, may be performed multiple times, or may be performed by different components. All steps, operations, and functions of a flow diagram that are described herein are intended to indicate operations that are performed using programming in a special-purpose computer or general-purpose computer, in various embodiments. Each flow diagram and block diagram is presented at the same level of detail that persons skilled in the applicable technical fields use to communicate with one another about plans, specifications, algorithms, and data structures as a basis for programming implementations to solve the applicable technical problems, while also applying their accumulated knowledge and skill of computer architecture, programming, and engineering techniques. Each flow diagram in this disclosure provides a guide, plan, or specification of an algorithm for programming a computer to execute the functions that are described.

In step 302, query metrics that indicate a set of counts of expected results for a plurality of partial hashes are stored in one or more digital data repositories. For example, client computer 102 receives query metrics from server computer 112 and stores the query metrics in metric database 108. Query metrics may be received periodically by client computer 102 from server computer 112 and stored in metric database 108.

In one embodiment, query metrics are received and/or stored in a compressed format. The compressed format includes a set of counts of expected results with an implicit index. For example, a set of counts of expected results comprises the set: {'abcdefg0': 25 values; 'abcdefg1': 2 values; 'abcdefg2' 10 values; 'abcdefg3': 25 values; 'abcdefg4': 2 values; 'abcdefg5' 10 values; 'abcdefg6': 31 values; 'abcdefg7': 2 values; 'abcdefga' 10 values; 'abcdefgb': 25 values; 'abcdefgc': 2 values; 'abcdefgd' 10 values; 'abcdefge': 25 values; 'abcdefgf': 2 values; 'abcdefgg' 10 values; 'abcdefgf' 29 values;}. The set includes 16 values. As shown in the set, each different key value represents a distinct partial hash. Each distinct partial hash includes a same subset of characters as the other partial hashes of the set (i.e. the same first seven characters) and a distinct eighth character. As shown in the set, each eighth character of the sixteen partial hashes is a distinct hexadecimal value, ranging from 0-f in order from the first entry of the set. In one embodiment, a set of counts of expected results is encoded in JSON format.

To compress the set, the key values of the set are indexed implicitly at the client side. Each of the sixteen values of the set are converted into a five bit value. Each five bit value is concatenated with the other five bit values of the set to create a string of 80 total bits. For example, for the first entry of the set: ('abcdefg0': 25 values), the key value 'abcdefg0' is removed. '25 values' is converted into a five bit representation such as the binary value '11001'. For the second entry of the set: ('abcdefg1': 2 values), the key value 'abcdefg1' is removed. '2 values' is converted into a five bit representation such as '00010'. The five bit representation of the first value '11001' is combined with the five bit representation of the second value '00010' to create the string '1100100010'. The same conversion and concatenation are performed with respect to the remaining fourteen values of the set to create concatenated string with 80 total bits (i.e. 10 bytes). Because each set is standardized at 80 bits and each member of the set is five bits, client computer 102 can identify each value of the set using the implicit index information, without the key values being included as part of a file that includes the set.

By compressing query metrics (i.e. set of counts of expected results) using the above discussed techniques, query metrics can be transmitted to and stored at client computer 102 and stored in metric database 108 more quickly and efficiently than previous techniques. These techniques also lead to a reduction in the use of storage, memory, and network bandwidth compared to previous techniques that required more than five bits to represent each value of the set. In some embodiments, using the compressed format with implicit indexing, query metrics may be received periodically by client computer 102, such as on a weekly or monthly basis.

In step 304, a first partial hash of user identity information is generated based on the user identify information that forms a target of a computer database search strategy. The first partial hash comprises a plurality of characters. For example, client computer 102 first generates a full hash of user identity information. User identity information may comprise a username, email address, credit card number, geolocation, financial account number or any identification value that identifies a user. Any applicable hash function may be used to generate a full hash of the particular user identity information. An example hash algorithm that may be used in SHA-256. Based on the full hash of the particular user identity information, client computer 102 generates a partial hash of the particular user identity information, the partial hash comprising a plurality of characters.

In one embodiment, the partial hash of the particular user identity information comprises a subset of characters of a full hash of the user identity information. For example, the partial hash of the particular user identity information may comprise the first eight characters of the full SHA-256 hash of the user identity information.

In step 306, a local query is generated and submitted to the one or more digital data repositories. The local query comprises a subset of characters of the plurality of characters of the first partial hash. For example, client computer 102 generates a local query by selecting a subset of characters of the plurality characters of the first partial hash generated in step 304. As an example, if the first partial hash comprises eight characters, seven of the eight characters are selected as the subset of characters of the first partial hash. Once the local query is generated, client computer 102 submits the local query to metric database 108.

In step 308, query metrics are received in response to submitting the local query to the one or more digital data repositories. The query metrics indicate a set of counts of expected results associated with the subset of characters of the first partial hash. The set of counts of expected results associated with the subset of characters of the first partial hash includes a plurality of partial hashes and corresponding values of expected results. Each of the plurality of partial hashes includes the subset of characters of the first partial hash. The plurality of partial hashes includes the first partial hash. For example, client computer 102 executes the local query against database 108 to retrieve query metrics that specify a set of counts of expected results associated with the subset of characters included in the local query.

As an example, the query metrics for the subset of characters of the first partial hash may comprise a JSON or XML file that includes a set of counts of expected results associated with the subset of characters of the first partial hash. If the first partial hash is 'abcdefgh' and the subset of characters of the first partial hash is 'abcdefg', the set of counts of expected results will include multiple counts of expected results for queries that include the subset of characters of the first partial hash 'abcdefg'. The set of counts may include key values that include at least the subset of characters of the first partial hash and corresponding counts of expected results. For example, the set may include key values that comprise: the subset of characters of the first partial hash appended to an additional character and corresponding counts of expected results such as: {abcdefga: 10 values; abcdefgb: 22 values; abcdefgc: 31 values; abcdefgd; 40 values}. As shown, the set of counts of expected results includes a count of expected results for a plurality of partial hashes that includes the first partial hash.

In step 310, it is determined, based on the query metrics, whether a count of expected results of the first partial hash satisfies a threshold count of expected results. For example, client computer 102 compares a count of expected results of the first partial hash from the query metrics obtained in step 308 to a threshold count of expected results to determine whether the threshold is satisfied. The threshold count of expected results may be specified by an administrator of client computer 102 or automatically set to a default value.

In step 312, in response to determining that the count of expected results of the first partial hash satisfies the threshold count of expected results, a remote query is generated and transmitted to a server computer. The remote query is based on the first partial hash. In response to transmitting the remote query, a set of user identity records that match at least the first partial hash is received and stored. The set of user identity records includes one or more user identity records that match the user identity information that forms the target of the computer database search strategy includes and one or more user identity records that do not match the user identity information that forms the target of the computer database search strategy.

For example, client computer 102 determines that the count of expected results of the first partial hash from the query metrics satisfies the threshold count of expected result. In response to the determination, a remote query is generated based on the partial hash. The remote query comprises the first partial hash. Client computer 102 transmits the remote query to server computer 112. Server computer 112 executes the remote query against database 116 to retrieve a set of user identity records that match the first partial hash. Identifying the set of user identity records that match at least the first partial hash may comprise first identifying a set of hashed user identity records that match the partial hash. Based on the set of hashed user identity records, a corresponding set of unhashed user identity records is identified in database 116.

As an example, assume the first partial hash is 'abcdefgh'. Assume the subset of characters of the first partial hash is 'abcdefg'. Assume the set of counts of expected results associated with the subset of characters of the first partial hash comprises the set: {'abcdefgh': 25 values; 'abcdefga': 2 values; 'abcdefgb' 10 values;}. As shown in the set, each different partial hash includes the subset of characters of the first partial hash 'abcdefg'. Now assume the threshold count of expected results is defined as '20 values'. By analyzing the set of counts of expected results associated with the subset of characters of the first partial hash, it can be determined that the first partial hash: 'abcdefgh' is associated with a count of 25 values and thus satisfies the threshold count of expected results of '20 values'.

In one embodiment, in response to determining that the count of expected results of the first partial hash does not satisfy the threshold count of expected results, a second partial hash is selected from the set of counts of expected results associated with the subset of characters. For example, if the count of expected results of the first partial hash does not satisfy the threshold count of expected results, a second partial hash is randomly selected from the plurality of partial hashes included in the set of counts of expected results.

As an example, assume the first partial hash is 'abcdefgh'. Assume the subset of characters of the first partial hash is 'abcdefg'. Assume the set of counts of expected results associated with the subset of characters of the first partial hash comprises the set: {'abcdefgh': 25 values; 'abcdefga': 2 values; 'abcdefgb' 10 values;}. As shown in the set, each different partial hash includes the subset of characters of the first partial hash 'abcdefg'. Now assume the threshold count of expected results is defined as '30 values'. Because the set of counts of first partial hash 'abcdefgh' does not satisfy the threshold count of '30 values', a second partial hash is randomly selected from the plurality of partial hashes included in the set of counts of expected results. Now assume that the second partial hash that is selected is 'abcdefgb', which corresponds to '10 values'. By combining the '25 values' of the first partial hash with the '10 values' of the second partial hash, the threshold count of expected results is satisfied. The first partial hash and the second partial hash can be combined into a single query and transmitted to server computer 112 to obtain a threshold amount of results.

In some embodiments, if the first partial hash and second partial hash do not satisfy the threshold count of expected results, a third partial hash is randomly selected from the plurality of partial hashes included in the set of counts of expected results. The count of expected results of the third partial hash is combined with the counts of expected results of the first and second partial hashes to determine if the total count of the first, second and third partial hashes satisfy the threshold count of expected results. If the threshold count of expected results is satisfied, the first partial hash, the second partial hash, and third partial hash can be combined into a single query and transmitted to server computer 112 to obtain a threshold amount of expected results. In some embodiments, the procedure of randomly selecting partial hashes from the plurality of partial hashes and combining the partial hashes into a single query is repeated until the threshold amount of expected results is satisfied.

In some embodiments, the order of partial hashes included in the remote query is randomized. For example, if the remote query is for three partial hashes, the order of the three partial hashes as specified in the remote query is randomized to further obfuscate the remote query.

In some embodiments, the set of user identity records returned from server computer 112 is stored in memory at client computer 102. For example, the received set of user identity records is stored in in-memory datastore 106 for quick access by client computer 102.

In step 314, the set of user identity records is queried using the user identity information and in response, a result set of user identity records is received. The result set of user identity records comprises one or more user identity records that match the user identity information. In some embodiments, the result set of user identity records is unhashed. For example, client computer 102 queries in-memory datastore 106 using the user identity information. The query returns a result set of user identity records that match the user identity information.

5. EXAMPLE IMPLEMENTATION

Figure 4:
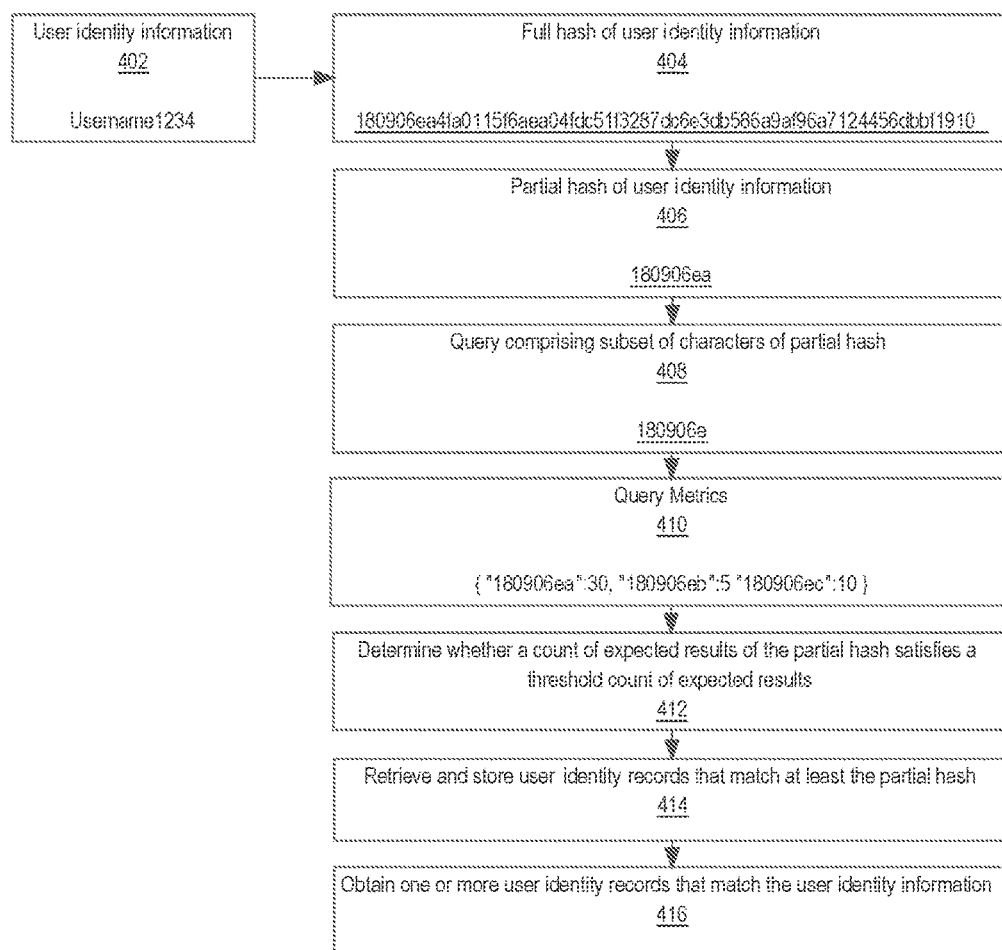
FIG. 4 illustrates an example of partial obfuscation of data records in result sets resulting from search queries, according to an embodiment.

FIG. 4 illustrates an example of partial obfuscation of data records in result sets resulting from search queries. FIG. 4 is discussed in context of FIG. 1 with reference to client computer102 and server computer 106 performing various actions.

FIG. 4 shows user identity information 402 before it is hashed by a hash function. In this example, user identity information comprises a username: "Username1234" that identifies a user account. Client computer 102 uses a hash function to generate a full hash of "Username1234", represented as the full hash of user identity information 402: "180906ea4fa0115f6aea04fdc51f3287dc6e3db586a9af96-a7124456dbbf1910". Once the full hash of user identity information is generated, a partial hash of user identity information 206 is generated. In this example, the partial hash of user identity information 406 is generated by selecting the first eight characters from the full hash of user identity information 404 as the partial hash of user identity information: "180906ea". Once the partial hash of user identity information 406 is generated, client computer 102 generates a query that comprises a subset of characters of the partial hash 408. In this example, the subset of characters of the partial hash comprises the first seven characters of the partial hash.

The generated query is used to retrieve query metrics 410 from either: database 116 managed by server computer 112 or metric database 108 managed by client computer 102, depending upon the implementation. The query metrics 410 indicate a set of counts of expected results associated with the subset of characters of the partial hash. As shown in this example, query metrics 410 include the set: {"180906ea": 30, "180906eb":5 "180906ec":10}. Each value in the set represents a partial hash that includes the subset of characters of the partial hash and a corresponding count of expected results. For example, the partial hash "180906ea" has 30 expected results. The partial hash "180906eb" has 5 expected results. The partial hash "180906ec" has 10 expected results.

Once query metrics 410 are received by client computer 102, client computer 102 determines whether a count of expected results of the partial hash satisfies a threshold count of expected results 412. In this example, the partial hash of user identity information "180906ea" has a count of 30 expected results based on query metrics 410. If client computer 102 determines that the count of expected results of the partial hash "180906ea" satisfies the threshold count of expected results, a query is generated based on the partial hash "180906ea" and transmitted to server computer 112.

If client computer 102 determines that the count of expected results of the partial hash "180906ea" does not satisfy the threshold count of expected results, an additional partial hash from the set: "180906ea":30, "180906eb":5 "180906ec":10 is randomly selected by client computer 102. The count of expected results for the partial hash "180906ea" is added to the count of expected results randomly selected additional partial hash from the set. Client computer 102 then determines whether the total count of expected results of the partial hash "180906ea" and the additional partial hash satisfy the threshold count of expected results. If client computer 102 determines that the total count of expected results of the partial hash "180906ea" and the additional partial hash satisfy the threshold count of expected results, a query is generated based on the partial hash "180906ea" and additional partial hash, and transmitted to server computer 112. In an embodiment, additional partial hashes from the set {"180906ea":30, "180906eb":5 "180906ec":10} are randomly selected and analyzed by client computer until the threshold count of expected results is satisfied by the total added count of expected results of the selected partial hashes.

Client computer 102 retrieves and stores user identity records that match at least the partial hash 414. For example, upon receiving the query transmitted by client computer 102 in response to step 414, server computer 112 queries database 116 to retrieve a set of user identity records that match the one or more partial hashes specified in the query and transmits the set of user identity records to client computer 102. Upon receiving the set of user identity records, client computer 102 stores the set of user identity records in in-memory datastore 106 for quick access and search.

Once the set of user identity records is stored in in-memory datastore 106, client computer 102 obtains one or more user identity records that match the user identity information 416. For example, client computer 102 queries the set of data records stored in in-memory datastore 106 using user identity information 402 to obtain a result set of user identity records comprising one or more user identity records that match the user identity information 402.

Techniques discussed herein provide partial obfuscation of data records in result sets resulting from search queries. For example, by generating a first query comprising a first partial hash of user identity information that is to be searched against a database, any malicious actor that intercepts the request will be unaware of the core data that the partial hash represents. To further enhance security and obfuscation, only a subset of characters of the first partial hash are used in the first query.

Additionally, the first query is used to obtain query metrics that indicates sets of counts of expected results for partial hashes that include the subset of characters of the first partial hash. By analyzing the set of counts of expected results for different partial hashes, a second query can be generated that further obfuscates the target of the database search.

For example, assume the target of a database search is "Username1234" represented by first partial hash "abcdefgh". If a client transmits a single query that only includes the first partial hash "abcdefgh" with 5 expected results, any malicious actor that intercepts the query or is able to access a log of the query may be able to identify, with relative ease, a target piece of data in the database that the client is searching for. To further obfuscate the database search, the target of the database search, i.e. the first partial hash "abcdefgh", is combined with additional partial hashes that retrieve a threshold amount of results. For example, the first partial hash "abcdefgh" may be combined with a second partial hash "abcdefga" and "abcdefgb" to retrieve a total of 35 expected results.

A server performs the database search using the second query and the result data records of the second query are transmitted to the client and stored on the client side. The results data records are queried on the client side with the original target of the database search, i.e. "Username1234", to filter out any data records that were retrieved and stored as a means to obfuscate the second query. The end result provides a client with a targeted database search that includes a combination of multiple layers of security that effectively reduce sensitive data exposure and attack surface area to malicious actors.

It will be apparent that the techniques of this disclosure provide numerous benefits including reducing the use of computer CPU cycles, storage, memory and network bandwidth that otherwise would be used to obfuscate a query for information and obfuscate the result information over a network. As one specific example, by hashing a database of user identity records and searching the database using partial hashes, the database can quickly be searched using simple character comparisons and the result data can be securely and efficiently transmitted with other results that are meant to obfuscate the target of the database search. There is no need for resource intensive encryption techniques. Instead, techniques discussed herein conserve computing resources required to query for and share sensitive data with client devices while reducing the exposure of surface attack area of the sensitive data.

6. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
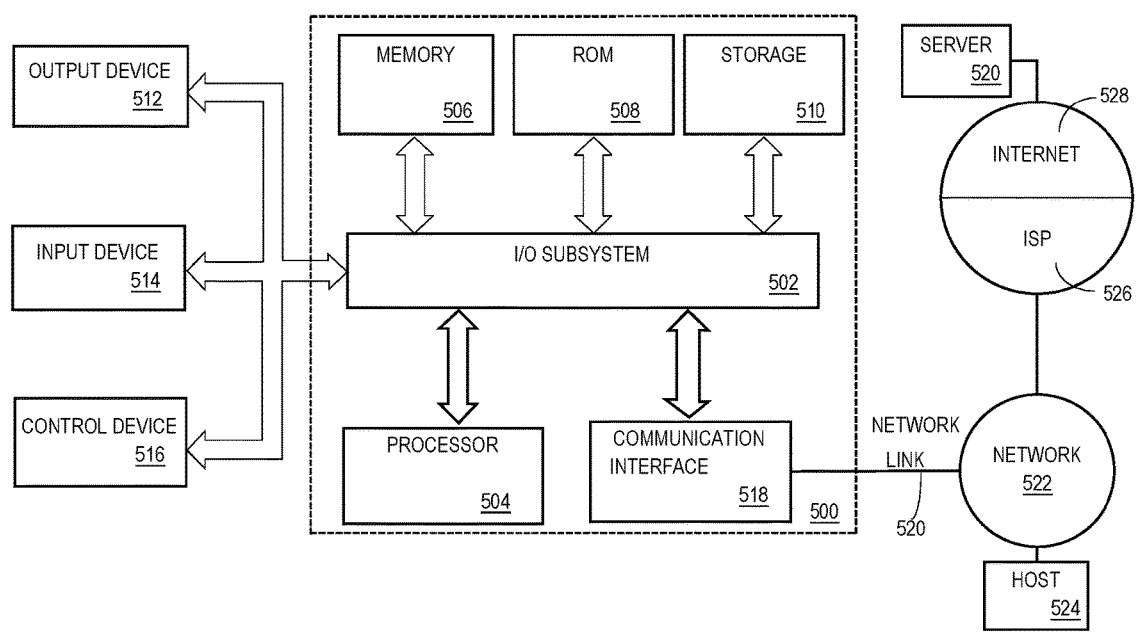
FIG. 5 illustrates an example computer system, according to an embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

7. OTHER ASPECTS OF DISCLOSURE

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method providing an improvement in computer security by partial obfuscation of data records in result sets resulting from search queries, the method comprising:
based on user identity information that forms a target of a computer database search strategy, generating a first partial hash of the user identity information, the first partial hash comprising a plurality of characters;
generating and transmitting a first query to a server computer, the first query comprising a subset of characters of the plurality of characters of the first partial hash;
in response to transmitting the first query to the server computer, receiving query metrics that indicate a set of counts of expected results associated with the subset of characters, the set of counts of expected results including a plurality of partial hashes and corresponding values of expected results, the plurality of partial hashes including the first partial hash;
determining, based on the query metrics, whether a count of expected results of the first partial hash satisfies a threshold count of expected results;
in response to determining that the count of expected results of the first partial hash satisfies the threshold count of expected results: generating and transmitting a second query to a server computer, the second query being based on the first partial hash, and in response, receiving and storing a set of user identity records that match at least the first partial hash;
querying the set of user identity records using the user identity information and in response, receiving a result set of user identity records, the result set of user identity records comprising one or more user identity records that match the user identity information.

2. The method of claim 1, further comprising:
in response to determining that the count of expected results of the first partial hash does not satisfy the threshold count of expected results:
selecting a second partial hash from the set of counts of expected results associated with the subset of characters;
determining, based on the query metrics, whether a total count of expected results of the first partial hash and the second partial hash satisfies the threshold count of expected results.

3. The method of claim 2, further comprising:
in response to determining that the total count of expected results of the first partial hash and the second partial hash satisfies the threshold count of expected results:
generating and transmitting a third query to the server computer based on the first partial hash and the second partial hash and in response, receiving and storing the set of user identity records that match at least the first partial hash and the second partial hash.

4. The method of claim 2, wherein the second partial hash comprises the subset of characters of the first partial hash and at least one other character.

5. The method of claim 1, wherein the user identity information comprises at least one of: a username, an email address, a password, a credit card number, or a geolocation.

6. The method of claim 1, wherein the result set of user identity records is unhashed.

7. The method of claim 1, wherein the set of user identity records includes one or more user identity records that match the user identity information and includes one or more user identity records that do not do not match the user identity information.

8. The method of claim 1, wherein the set of user identity records is stored in memory.

9. A computer-implemented method providing an improvement in computer security by partial obfuscation of data records in result sets resulting from search queries comprising:
storing, in one or more digital data repositories, query metrics that indicate a set of counts of expected results for a plurality of partial hashes;
based on user identity information that forms a target of a computer database search strategy, generating a first partial hash of the user identity information, the first partial hash comprising a plurality of characters;

generating and submitting a local query to the one or more digital data repositories, the local query comprising a subset of characters of the plurality of characters of the first partial hash;

in response to submitting the local query to the one or more digital data repositories, receiving query metrics that indicate a set of counts of expected results associated with the subset of characters, the set of counts of expected results including a plurality of partial hashes and corresponding values of expected results, the plurality of partial hashes including the first partial hash;

determining, based on the query metrics, whether a count of expected results of the first partial hash satisfies a threshold count of expected results;

in response to determining that the count of expected results of the first partial hash satisfies the threshold count of expected results: generating and transmitting a remote query to a server computer based on the first partial hash and in response, receiving and storing a set of user identity records that match at least the first partial hash;

querying the set of user identity records using the user identity information and in response, receiving a result set of user identity records, the result set of user identity record comprising one or more user identity records that match the user identity information.

10. The method of claim 9, further comprising:
in response to determining that the count of expected results of the first partial hash does not satisfy the threshold count of expected results:
  selecting a second partial hash from the set of counts of expected results associated with the subset of characters;
  determining, based on the query metrics, whether a total count of expected results of the first partial hash and the second partial hash satisfies the threshold count of expected results.

11. The method of claim 10, further comprising:
in response to determining that the total count of expected results of the first partial hash and the second partial hash satisfies the threshold count of expected results:
generating and transmitting a remote query to the server computer based on the first partial hash and the second partial hash and in response, receiving and storing the set of user identity records that match at least the first partial hash and the second partial hash.

12. The method of claim 10, wherein the second partial hash comprises the subset of characters of the first partial hash and at least one other character.

13. The method of claim 9, wherein the query metrics are received in a compressed format with an implicit index.

14. The method of claim 9, wherein the query metrics are received and stored periodically.

15. The method of claim 9, wherein the set of user identity records is stored in memory.

16. The method of claim 9, wherein the set of user identity records includes one or more user identity records that match the user identity information and includes one or more user identity records that do not do not match the user identity information.

17. A computer system comprising:
one or more processors;
one or more memories storing instructions which, when executed by the one or more processors, cause the one or more processors to perform:
based on user identity information that forms a target of a computer database search strategy, generating a first partial hash of the user identity information, the first partial hash comprising a plurality of characters;
generating and transmitting a first query to a server computer, the first query comprising a subset of characters of the plurality of characters of the first partial hash;
in response to transmitting the first query to the server computer, receiving query metrics that indicate a set of counts of expected results associated with the subset of characters, the set of counts of expected results including a plurality of partial hashes and corresponding values of expected results, the plurality of partial hashes including the first partial hash;
determining, based on the query metrics, whether a count of expected results of the first partial hash satisfies a threshold count of expected results;
in response to determining that the count of expected results of the first partial hash satisfies the threshold count of expected results: generating and transmitting a second query to a server computer, the second query being based on the first partial hash, and in response, receiving and storing a set of user identity records that match at least the first partial hash;
querying the set of user identity records using the user identity information and in response, receiving a result set of user identity records, the result set of user identity records comprising one or more user identity records that match the user identity information.

18. The system of claim 17, further comprising:
in response to determining that the count of expected results of the first partial hash does not satisfy the threshold count of expected results:
  selecting a second partial hash from the set of counts of expected results associated with the subset of characters;
  determining, based on the query metrics, whether a total count of expected results of the first partial hash and the second partial hash satisfies the threshold count of expected results.

19. The system of claim 18, further comprising:
in response to determining that the total count of expected results of the first partial hash and the second partial hash satisfies the threshold count of expected results:
generating and transmitting a third query to the server computer based on the first partial hash and the second partial hash and in response, receiving and storing the set of user identity records that match at least the first partial hash and the second partial hash.

20. The system of claim 18, wherein the second partial hash comprises the subset of characters of the first partial hash and at least one other character.

* * * * *